(12) United States Patent
Helm et al.

(10) Patent No.: US 7,667,614 B2
(45) Date of Patent: Feb. 23, 2010

(54) HOUSING FOR RECEIVING AN ELECTRICAL DEVICE

(75) Inventors: Wolfgang Helm, Bensheim (DE); Manfred Ruppert, Birkenheide (DE); Eckhard Berg, Gruenstadt (DE)

(73) Assignee: Pepperl + Fuchs GmbH, Mannheim (DE)

( * ) Notice: Subject to any disclaimer, the term of this patent is extended or adjusted under 35 U.S.C. 154(b) by 780 days.

(21) Appl. No.: 10/535,019

(22) PCT Filed: Jul. 24, 2003

(86) PCT No.: PCT/EP03/08173
§ 371 (c)(1),
(2), (4) Date: Oct. 31, 2005

(87) PCT Pub. No.: WO2004/047246
PCT Pub. Date: Jun. 3, 2004

(65) Prior Publication Data
US 2006/0102370 A1    May 18, 2006

(30) Foreign Application Priority Data
Nov. 18, 2002    (DE) .............................. 202 17 773 U

(51) Int. Cl.
*G08B 5/00* (2006.01)
(52) U.S. Cl. .............................. 340/815.4; 340/815.45; 340/815.56; 340/332; 362/240

(58) Field of Classification Search ............... 340/815.4, 340/815.45, 815.49, 332, 691.1, 691.6, 693.5; 362/296, 227, 240, 612, 613
See application file for complete search history.

(56) References Cited

U.S. PATENT DOCUMENTS

| 4,384,268 A * | 5/1983 | Matthewman ............... 340/985 |
| 4,468,814 A | 8/1984 | Field |
| 6,483,439 B1 * | 11/2002 | Vukosic .................. 340/815.65 |
| 2004/0046676 A1 * | 3/2004 | Taylor .................... 340/815.45 |

FOREIGN PATENT DOCUMENTS

| DE | 3918874 | 12/1990 |
| DE | 19512915 | 8/1996 |
| FR | 2643640 | 8/1990 |

* cited by examiner

*Primary Examiner*—Toan N Pham
(74) *Attorney, Agent, or Firm*—John W. LaBatt; Hoffman Warnick LLC

(57) ABSTRACT

The invention relates to a casing (i.e., housing) for receiving an electrical device, particularly a switching device or sensor, having at least one indicating apparatus for indicating different electrical states, particularly switching states, of the device. The casing is characterized in that each indicating apparatus has a plurality of indicating devices and that the indicating devices of one indicating apparatus are positioned facing one another on the casing in such a way that, from each viewing direction, at least one indicating device of each indicating apparatus can be seen.

20 Claims, 1 Drawing Sheet

HOUSING FOR RECEIVING AN ELECTRICAL DEVICE

This application claims priority to PCT Application No. PCT/EP2003/008173 filed Jul. 24, 2003, which claims the benefit of German Application No. 202 17 773.4 filed Nov. 18, 2002.

BACKGROUND OF THE INVENTION

1. Field of the Invention

The invention relates to a casing (i.e., housing) for receiving an electrical device, particularly a switching device or sensor, having at least one indicating or display apparatus for indicating or displaying different electrical states, particularly switching states, of the device, according to the preamble of claim 1.

The invention also relates to a casing for receiving an electrical switching device or sensor with an indicating device for indicating different electrical switching states of the electrical switching device or sensor, said casing being shaped in a substantially cuboid or cubic manner.

2. Description of Related Art

Numerous casings for receiving electrical switching devices or sensors are known. The casings have indicating devices for indicating different electrical switching states for monitoring the functionally correct operation of the electrical switching device or sensor. For example, DE 19512915 discloses an electrical connection part with electrically contacting contact pins or female contacts, such as plugs or sockets, which has a reception part in which is placed a light guide member made from transmissive material with at least one illuminant and through which are passed leads for the contact pins. The light guide member has arms, provided on their abutting ends on the side facing the illuminant with, in each case, a surface plane-inclined or curved in the direction of the longitudinal axis of the main radiation direction of the illuminant, which, in each case, form the reflecting deflecting surface of the arm and which are able to deflect the light mainly in the axial direction within the particular arm at an angle between approximately 40° and 140°, preferably at right angles to the main radiation direction thereof. The reflecting deflecting surfaces of the arms collide in each case in the axis of the main radiation direction of the illuminant in a point or edge directed towards the light guide member. Below the point or edge, the light guide member has a recess in which is located the illuminant.

This apparatus, like most of the known casings, suffers from the disadvantage that despite indicating the switching state of the electrical switching device or sensor, the switching state cannot be seen to the same extent from all spatial directions, so that in certain circumstances, a fault or a malfunction of the electrical switching device or of the sensor can occur without it being immediately noticed by an operator.

Additionally, FR 2643640 discloses a proximity switch with an illuminant, for example, a light emitting diode, being positioned in a transparent end piece. With the aid of this transparent end piece and a plurality of reflections obtained by this means, an improved visibility of the illuminant is obtained.

SUMMARY OF THE INVENTION

An object of the invention is to provide a casing of the afore-mentioned type in which the electrical states, i.e., in particular the switching states, can be particularly reliably monitored by an operator.

This object is achieved with a casing for receiving an electrical device, particularly a switching device or sensor, having at least one indicating apparatus for indicating different electrical states, particularly switching states, of the device, characterized in that each indicating apparatus has a plurality of indicating devices and that the indicating devices of an indicating apparatus are positioned facing one another on the casing in such a way that from each viewing direction at least one indicating device of each indicating apparatus is visible.

According to the invention, a casing of the above-mentioned kind is improved in that each indicating apparatus has a plurality of isochromatic indicating devices and that the indicating devices of an indicating apparatus on the casing are located opposing each other so that, from each viewing direction, at least one indicating device of each indicating apparatus is visible.

According to a further aspect of the invention, a second solution is that with a casing for receiving an electrical switching device or sensor of the aforementioned type for indicating different switching states of the electrical switching device or sensor, in those corners or angles which each are located on the same space diagonal, the casing has identical indicating devices. The indicating devices differing on different space diagonals, so that from each viewing direction on the casing it is always in each case possible to see one of the indicating devices for each of the different switching states to be indicated of the electrical switching device or sensor. On viewing one of the surfaces of the casing, as a result of this arrangement it is possible to see an indicating device from each spatial direction.

An important advantage of the invention is that the indicating device for indicating different electrical switching states or switching positions or switching states of the switching device or sensor can be clearly detected from each spatial direction.

If, e.g., a power-on indication and a further, different function switching state of the electrical switching device or sensor are to be indicated, the casing comprises for a first indication, e.g., for the power-on indication, as well as for a further, different indication, such as for indicating a switching state of the electrical switching device or sensor, in each two corners or angles, which are in each case located on the same space diagonal of two space diagonals, identical indicating devices. Said indicating devices on different space diagonals are different, so that from each viewing direction on the casing always in each case two indicating devices with different signalling are visible, which form an indication pair, e.g., namely in each case for power-on and a function switching state of the electrical switching device or sensor.

If, e.g., a power-on indication and two further, different function switching states of the electrical switching device or sensor are to be indicated, the casing comprises, for a first indication, e.g., for power-on indication, as well as for a second indication, such as for indicating a first switching state, as well as for a third indication, such as for indicating a second switching state of the electrical switching device or sensor, in each three corners or angles, which are in each case located on the same space diagonal of three space diagonals, identical indicating devices. Said indicating devices on different space diagonals are different, so that from each viewing direction on the casing always in each case three indicating devices with different signalling are visible, which form an indication triple, e.g., namely in each case for power-on and two different function switching states of the electrical switching device or sensor.

If, e.g., a power-on indication and three further, different function switching states of the electrical switching device or sensor are to be indicated, the casing comprises, for a first indication, e.g., for power-on indication, as well as for a second indication, such as for indicating a first switching state, as well as for a third indication, such as for indicating a second switching state, as well as for a fourth indication, such as for indicating a third switching state of the electrical switching device or sensor, in each case, four corners or angles, which are in each case located on the same space diagonal of four space diagonals, identical indicating devices. Said indicating devices on different space diagonals are different, so that from each viewing direction on the casing always in each case four of the indicating devices with different signalling are visible, which form a indication quadruple, e.g., namely in each case for power-on and three different function switching states of the electrical switching device or sensor.

According to a further development of the invention, the indicating devices can be incandescent lamps or light emitting diodes, which emit light of different colours and which can consequently be differentiated, those indicating devices located on the same space diagonal emitting isochromatic light, but those indicating devices located on different space diagonals emitting light with different colours.

According to a further development of the invention, within the casing and in those corners where indicating devices are located, there are viewing windows behind which is in each case positioned a light emitting diode or incandescent lamp.

Thus, the indicating device or a plurality of indicating devices can always be detected from all spatial directions, because when the operator views one or more of the boundary surfaces of the cubic or cuboid casing, in the presence of only one function indicating device, he is always able to see one of the two indicating devices. In this case, a distinction can, e.g., always be made between power-on and power-not-on.

If the device has two different function indicating devices, they form an indication pair, e.g., power-on and power-not-on and the switching state-s and the switching state-not-s and once again, in each case, one indication pair can be seen from each spatial direction and can be distinguished by different signalling, such as differently coloured light.

If the device has three different function indicating devices, they form an indication triple, e.g., power-on and power-not-on, switching state-s and switching state-not-s, as well as switching state-t and switching state-not-t and once again, in each case, one indication triple can be seen from each spatial direction and can be differentiated by different signalling, such as differently coloured light.

If the device has four different function indicating devices, they form an indication quadruple, e.g., power-on and power-not-on, switching state-s and switching state-not-s, switching state-t and switching state-not-t as well as switching state-r and switching state-not-r and once again, in each case, one indication quadruple can be seen from each spatial direction and can be differentiated by different signalling, such as differently coloured light.

BRIEF DESCRIPTION OF THE DRAWINGS

An embodiment of the invention is illustrated by the drawings, which show.

DESCRIPTION OF THE PREFERRED EMBODIMENT

Figure 1:
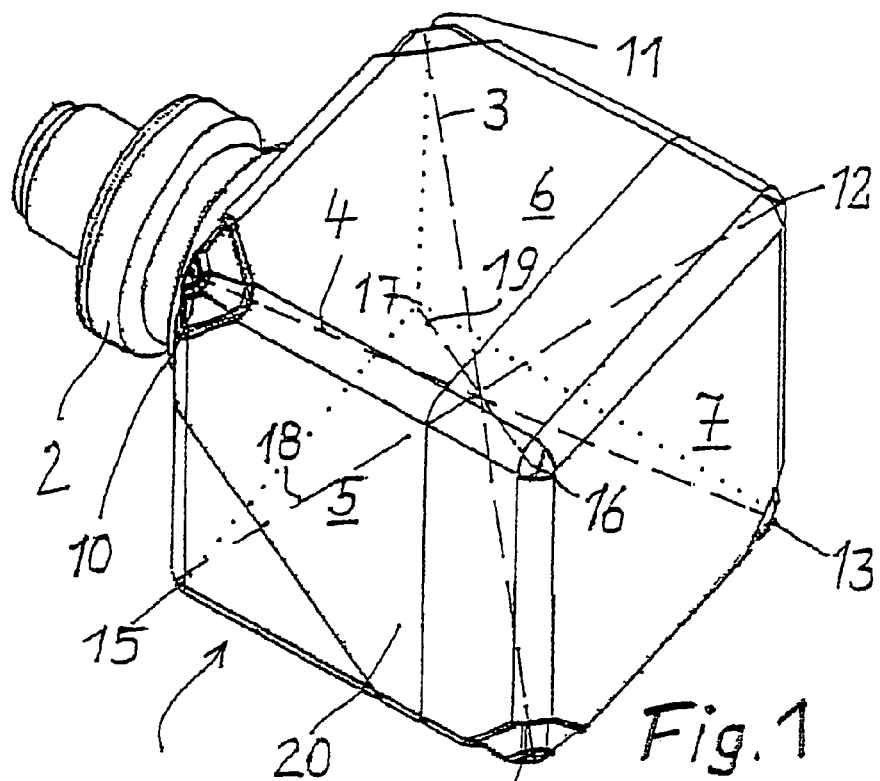
FIG. 1 is a perspective view of a cubic casing (i.e., housing) for receiving an electrical switching device or sensor, said casing having two different function indicating devices, which together form an indication pair.
Figure 2:
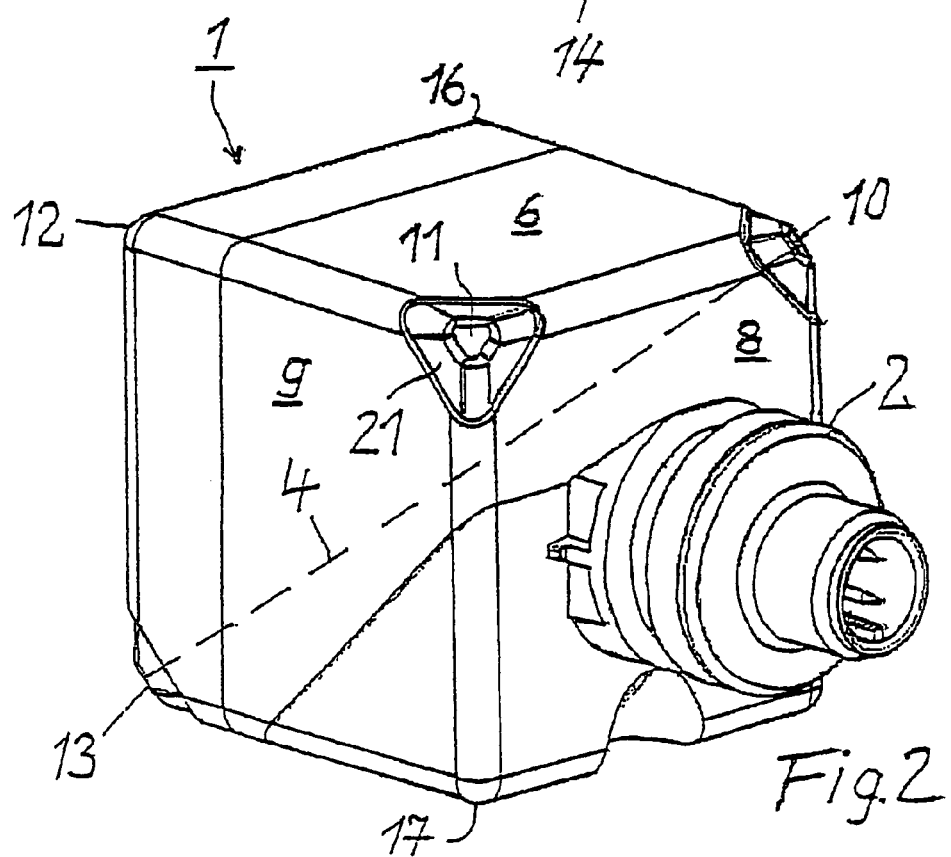
FIG. 2 is a view of the cubic casing of FIG. 1 turned by 180° to illustrate the fact that always one indication pair of different function indications can be seen from each spatial direction.

The casing (i.e., housing) 1 shown in FIGS. 1 and 2 is a cube, which is bounded by its boundary surfaces 5, 6, 7, 8, 9 and 20 and has the angles or corners 10, 11, 12, 13, 14, 15, 16 and 17. Between the corners 10-13, 11-14, 12-15 and 16-17 the space diagonals 4, 3, 18 and 19 extend, respectively. On the boundary surface 8 is located a mounting flange 2, which is, e.g., used for flanging the casing 1 to a mounting base not shown, which for this purpose has a suitable opening for receiving the mounting flange 2.

The casing 1 shown in FIGS. 1 and 2 is such that it is able to indicate or display two different switching states. For example, the casing 1 is used for a power-on indication and for indicating a further switching state of the electrical switching device or sensor. To this end, the casing 1 is provided in two corners 10-13, which are located on the same space diagonal 4, in each case with an indicating apparatus having two identical indicating devices 10 and 13. Further, in the two corners 11-14 located on the same space diagonal 3, the casing 1 has a further indicating apparatus with two identical indicating devices 11 and 14. However, the indicating devices on the different space diagonals 3 and 4 differ, so that they can be distinguished. So, directly adjacent indicating devices 10-11 and 13-14 in each case form an indication pair with different signalling of states and of the two indication pairs 10-11, 13-14 respectively, it is always possible to see one indication pair 10-11 or 13-14 from each viewing direction on the casing 1.

One indication pair of the indicating devices can, e.g., comprise different light emitting diodes 10, 11, 13, 14, the diagonally facing light emitting diodes 10, 13 in the diagonally facing corners 10, 13 of the casing 1, e.g., emitting light in the red spectrum. The diagonally facing light emitting diodes 11, 14 in the diagonally facing corners 11, 14 however, e.g., emitting light in the green spectrum, so that in this way it is possible to distinguish the different functional states of the electrical switching device or sensor within the casing 1.

FIG. 2 also shows that each corner in which an indicating device is located, such as in corner 11 indicating device 11, is covered with a translucent viewing window 21, behind which is located the indicating device in the form of a light emitting diode 11.

REFERENCE NUMERALS LIST

1 Cubic casing
2 Mounting flange
3, 4, 18, 19 Space diagonals
5, 6, 7, 8, 9 Top surfaces of the casing
10, 11, 13, 14 Indicating devices and simultaneously corners of the casing
15, 16, 17 Remaining corners of the casing
21 Translucent viewing window

What is claimed is:

1. A casing for receiving an electrical device, the casing comprising:
   a plurality of sides that form a substantially cubic structure; and
   a first indicating apparatus for indicating a first set of different electrical states of the device, wherein the first indicating apparatus includes a first plurality of isochromatic indicating devices that are located on facing corners of one of the space diagonals of the casing.

2. The casing of claim 1, wherein the electrical device comprises one of a switching device or a sensor.

3. The casing of claim 1, wherein the electrical states comprise switching states.

4. The casing of claim 1, further comprising a second indicating apparatus for indicating a second set of different electrical states of the device, wherein the second indicating apparatus includes a second plurality of isochromatic indicating devices that are located on facing corners of one of the plurality of space diagonals of the casing.

5. The casing of claim 4, wherein each of the first and second pluralities of isochromatic indicating devices are located on a unique space diagonal.

6. The casing of claim 4, wherein the first plurality of isochromatic indicating devices comprise a first colour and the second plurality of isochromatic indicating devices comprise a second colour different from the first colour.

7. The casing of claim 4, wherein the first set of different electrical states comprise a set of power states for the electrical device and the second set of different electrical states comprise a set of switching states for the electrical device.

8. The casing of claim 4, further comprising a third indicating apparatus for indicating a third set of different electrical states of the device, wherein the third indicating apparatus includes a third plurality of isochromatic indicating devices that are located on facing corners of one of the plurality of space diagonals of the casing.

9. The casing of claim 8, wherein each of the first, second, and third pluralities of isochromatic indicating devices are located on a unique space diagonal.

10. The casing of claim 8, further comprising a fourth indicating apparatus for indicating a fourth set of different electrical states of the device, wherein the fourth indicating apparatus includes a fourth plurality of isochromatic indicating devices that are located on facing corners of one of the plurality of space diagonals of the casing.

11. The casing of claim 10, wherein each of the first, second, third and fourth pluralities of isochromatic indicating devices are located on a unique space diagonal.

12. The casing of claim 1, wherein the first plurality of isochromatic indicating devices are identical.

13. The casing of claim 1, wherein the first plurality of isochromatic indicating devices comprise one of a plurality of light emitting diodes or a plurality of incandescent lamps.

14. The casing of claim 1, further comprising, at each of the facing corners of the one of the plurality of space diagonals, a translucent viewing window.

15. A casing for receiving an electrical device, the casing comprising:
a first indicating apparatus for indicating a first set of different electrical states of the electrical device, wherein the electrical device is one of: a switching device or a sensor, and wherein the first indicating apparatus includes a first plurality of indicating devices that are located on the casing such that at least one of the first plurality of indicating devices is visible from each viewing direction for the casing.

16. The casing of claim 15, wherein the casing comprises a plurality of sides that form a substantially cubic structure, and wherein the first plurality of indicating devices are located on facing corners of one of the space diagonals of the casing.

17. The casing of claim 15, wherein the first plurality of indicating devices comprise a plurality of isochromatic indicating devices.

18. The casing of claim 15, further comprising a second indicating apparatus for indicating a second set of different electrical states of the electrical device, wherein the second indicating apparatus includes a second plurality of indicating devices that are located on the casing such that at least one of the second plurality of indicating devices is visible from each viewing direction for the casing.

19. A casing for receiving an electrical device, the casing comprising:
a first indicating apparatus for indicating a set of power states for the electrical device, wherein the electrical device is one of: a switching device or a sensor, and wherein the first indicating apparatus includes a first plurality of indicating devices that are located on the casing such that at least one of the first plurality of indicating devices is visible from each viewing direction for the casing; and
a second indicating apparatus for indicating a set of switching states for the electrical device, wherein the second indicating apparatus includes a second plurality of indicating devices that are located on the casing such that at least one of the second plurality of indicating devices is visible from each viewing direction for the casing.

20. The casing of claim 19, wherein the first plurality of indicating devices comprise a first colour and the second plurality of indicating devices comprise a second colour different from the first colour.

* * * * *